Nov. 5, 1968  J. A. LEVENDUSKY  3,409,566
METHOD OF GRINDING STRONG BASE ION EXCHANGE
RESINS IN THE HYDROXIDE FORM
Filed Jan. 30, 1964
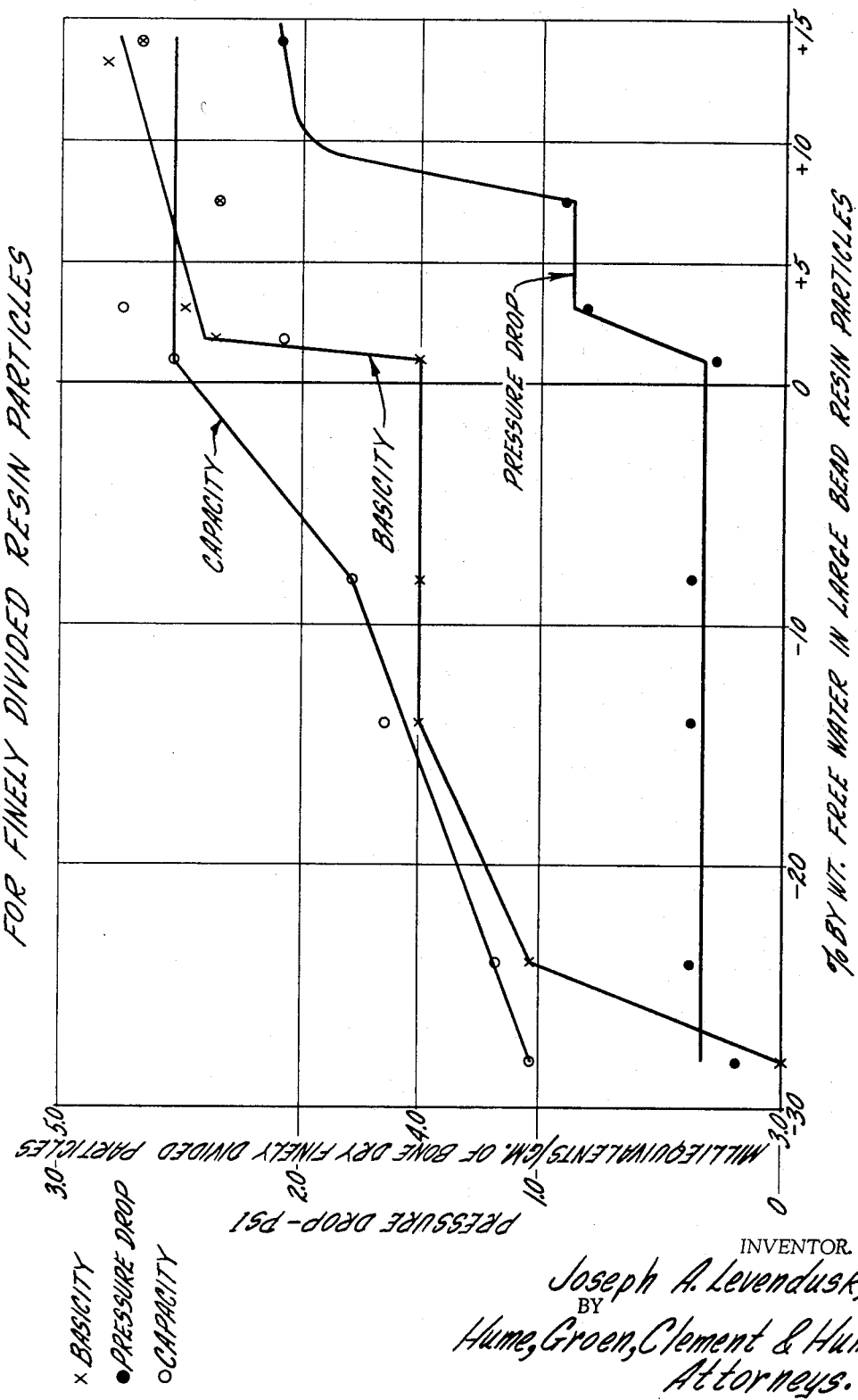
INVENTOR.
Joseph A. Levendusky,
BY
Hume, Groen, Clement & Hume
Attorneys.

3,409,566
Patented Nov. 5, 1968

3,409,566
METHOD OF GRINDING STRONG BASE ION EXCHANGE RESINS IN THE HYDROXIDE FORM
Joseph A. Levendusky, Bayonne, N.J., assignor to Union Tank Car Company, Chicago, Ill., a corporation of Delaware
Filed Jan. 30, 1964, Ser. No. 341,847
5 Claims. (Cl. 260—2.1)

This invention relates to ion exchange resin particles in the size range of about 60 to 400 mesh and, more particularly, to a method of making strong base, divinylbenzene-styrene copolymer anion exchange resin particles (hereinafter called "resin particles") in the hydroxide form and in the size range of about 60 to 400 mesh. As is well known in the art, "strong base" resin particles refers to resin particles having quaternary ammonium as the principal functional group.

Heretofore hydroxide-form resin particles having a size range of about 60 to 400 mesh have been manufactured by grinding chloride-form resin particles in the size range of about 20 to 50 mesh and subsequently converting the ground chloride-form resin particles to the hydroxide form by contacting them with a suitable aqueous alkaline hydroxide solution. This method of manufacturing hydroxide-form resin particles in the size range of about 60 to 400 mesh is not entirely satisfactory as the resin particles contain entrapped chloride ions. When the resin particles are used to treat a liquid stream, such as a condensate water, the chloride ions are released and appear in the effluent. It is theorized that during the grinding of these resin particles portions of the resin matrix collapse and entrap some of the chloride ions. The entrapped chloride ions in the matrix, for the most part, are not affected when the resin particles are subsequently converted from the chloride form to the hydroxide form. However, during prolonged use of the resin particles the chloride ions have an opportunity to escape and will appear as an impurity in the effluent. Furthermore, the resin particles made in this manner have a comparatively low capacity, i.e., ability to remove anions from an acid solution.

In an effort to avoid these problems, hydroxide-form resin particles having a size range of about 20 to 50 mesh have been ground to the size range of about 60 to 400 mesh. Resin particles manufactured in this manner have been even less desirable, however, since they have low basicity, low capacity and/or an excess of fines (i.e., extremely small particles which substantially increase the pressure drop across a layer of the resin particles). It is therefore desirable to provide a method of making hydroxide-form resin particles in the size range of about 60 to 400 mesh from the same type of resin particles in the size range of about 20 to 50 mesh, the resin particles so produced having high basicity and capacity and a relatively small amount of fines.

It is an object of the present invention to provide a method of making hydroxide-form resin particles in the size range of about 60 to 400 mesh.

It is a further object to provide a method of making hydroxide-form resin particles in the size range of about 60 to 400 mesh which will not release chloride groups during treatment of liquid streams.

It is another object to provide a method of making hydroxide-form resin particles in the size range of about 60 to 400 mesh having high basicity and capacity.

Another object is to provide a method of making hydroxide-form resin particles in the size range of about 60 to 400 mesh that do not produce large pressure drops in fluid streams because of excessive fines.

These and other objects more apparent hereinafter are realized by the method of the present invention wherein hydroxide-form resin particles in the size range of about 60 to 400 mesh and having high basicity and capacity are made by adjusting the free water content of hydroxide-form resin particles in the size range of about 20 to 50 mesh to within the range of about 1.9 to 7.6% by weight of the resin particles and grinding these resin particles in a hammer mill to the size range of about 60 to 400 mesh. It is preferred that the free water content of the resin particles prior to grinding be within the range of about 2 to 5% by weight of the resin particles.

The invention, both as to its organization and method of operation, taken with further objects and advantages thereof, will be understood by reference to the following description taken in conjunction with the accompanying drawing, in which:

The figure is a graph of the "Basicity, Capacity and Pressure Drop for Finely Divided Resin Particles."

For convenience, the resin particles in the size range of about 20 to 50 mesh will be referred to as the "large bead" resin particles, while the resin particles in the size range of about 60 to 400 mesh will be referred to as the "finely divided" resin particles.

"Basicity" referred to herein is the measure of the ability of the resin particles to split a neutral salt, expressed in milliequivalents of anions removed from the aqueous salt solution per gram of bone dry anion resin particles. This is a measure also of the ability of the resin particles to remove weak acids and silica from aqueous streams, which is extremely important in purifying steam condensate streams. "Capacity" as used herein refers to the ability of the resin particles to remove anions from an acid solution, expressed in milliequivalents of anions removed from the acid solution per gram of bone dry anion resin particles.

As used herein, the term "free water" refers to the water that may be removed from resin particles with a Buchner funnel arrangement in which a sample of resin particles of predetermined weight is placed on filter paper in the funnel. The funnel is attached to a vacuum pump or the like which is then actuated. This draws air through the resin particles whereby water is removed from the resin particles. This is continued for 10 minutes and then the sample weighed again. The weight loss is the "free water" and is essentially all of the water physically held on the surface and in the interstices of the resin particles. The free water content of the resin particles based on the total weight of the resin particles may then be easily calculated. This is to be contrasted with the chemically held or bonded water in the resin particles, which, together with the physically held water, constitutes the "total water content" as used herein.

Considering the present invention in greater detail, hydroxide-form resin particles are well known in the art in the large bead size. In accordance with the present invention the free water content of these large bead resin particles is adjusted, prior to grinding, whereby the free water content is in the range of about 1.9 to 7.6% by weight of resin particles, preferably in the range of about 2 to 5% by weight. It is therefore necessary to first determine the amount of free water in the resin particles by using the Buchner funnel in the manner described above.

In accordance with the present invention, if the large bead resin particles have a free water content of less than about 1.9% by weight of the resin particles, free water must be added to the resin particles prior to grinding. Similarly, if the free water content of the resin particles is greater than about 7.6% by weight of the resin particles, then free water must be removed from the resin particles prior to grinding.

There are numerous methods by which free water may be added to the large bead resin particles, as will be readily understood by one with ordinary skill in the art.

For example, demineralized water may be sprayed over the resin particles in a sufficient amount and for a sufficient length of time until the resin particles have absorbed a sufficient amount to raise the free water content within the range of about 1.9 to 7.6% by weight of resin particles. There are, also, of course, numerous methods by which free water may be removed from the resin particles. For example, dry heated air may be passed through the resin particles. The techniques for removing and adding free water to the large bead resin particles is a matter within the ordinary skill of one in the art and does not per se constitute a part of the present invention.

After the free water content of the large bead resin particles has been adjusted to within the range of about 1.9 to 7.6% by weight, the large bead resin particles in accordance with the present invention are ground in a hammer mill to within the size range of 60 to 400 mesh. Any hammer mill may be used and such are well known. It has been empirically determined that other types of mills, such as a ball mill, are ineffective in that they produce finely divided resin particles of low basicity or large quantities of fines. The latter is undesirable because fines produce, among other things, high pressure drops across a bed or layer of the finely divided resin particles. An exemplary hammer mill is the Model A Pulva-Sizer made by Pulva Corporation, Perth Amboy, N.J. The size screen employed will be dependent, of course, upon the size in range of about 60 to 400 mesh desired and the selection of the proper screen size is a matter within the ordinary skill of one in the art.

The finely divided resin particles made in accordance with the present invention have many possible uses in the purification of liquids and gases. Of particular interest is the use of these finely divided resin particles as a pre-coat layer, with or without finely divided cation resin particles, on a filter screen. It has been found that such a pre-coated filter screen is extremely effective in purifying liquids and gases, and in particular in purifying condensate streams in the steam generating unit of an electrical power plant. Such use of resin particles made in accordance with the present invention is described in detail in applicant's United States Patent No. 3,250,703, issued May 10, 1966, and assigned to the assignee of present invention.

Some of the advantages of the present invention will be seen from the following examples:

EXAMPLE I

Hydroxide-form resin particles in the size range of about 20 to 50 mesh were tested for free water content. A 50 gm. sample of these large bead resin particles was weighed out and placed in a Buchner funnel. Air was sucked through the sample in the Buchner funnel by a vacuum pump for ten minutes to remove the free water held by the resin particles. The sample was then weighed. The loss in weight indicated the amount of free water held by these resin particles. The free water content of the resin particles was then calculated and was 3.1% by weight of resin particles.

The total water content of these large bead resin particles was also determined in the following manner. Another 50 gm. sample of these large bead resin particles was weighed out, placed in an oven and dried at 105° F. to constant weight. The weight loss of the resin particles was a measure of all the water physically and chemically held by the resin particles. The large bead resin particles were found to have a total water content of 62.1% by weight of resin particles.

About 50 lbs. of these resin particles were fed into a Model A Pulva-Sizer hammer mill. The Pulva-Sizer mill utilized a 0.35″ herringbone screen. The hammer mill ground the large bead resin particles to finely divided resin particles within the size range of about 100 to 400 mesh, a major portion by weight of the resin particles being in the size range of about 200 to 400 mesh.

A 50 gm. sample of the finely divided resin particles was weighed out, placed in an oven and dried at 105° F. to constant weight. The total water content of the finely divided resin particles was 58.5% by weight of the resin particles.

The finely divided resin particles were tested for free caustic content. A 10 gm. sample was weighed out and placed in a Buchner funnel. Poured over the sample were 200 cc. of dimineralized water. The water was sucked through the resin particles, collected and titrated with an acid solution. The water did not contain any caustic and therefore the resin particles did not contain any free caustic.

The basicity of the finely divided resin particles was also tested. One hundred milliliters of a 0.75 N aqueous solution of sodium chloride was passed through 10 gms. of the finely divided resin particles and collected. The resin particles were rinsed with demineralized water, the rinse water being collected and added to the sodium chloride solution. The mixture was titrated with an acid to determine the quantity of hydroxide ions that had been exchanged for chloride ions in the sodium chloride solution. In this manner, it was determined that the basicity of these finely divided resin particles was 4.74 milliequivalents of chloride ions removed per gram of bone dry resin particles.

The capacity of these resin particles was determined by passing 75 ml. of a 1.0 N hydrochloric acid solution through 10 gms. of the resin particles. The resin particles were rinsed and the rinse water mixed with the effluent hydrochloric acid. The mixture was titrated with a base to determine the milliequivalents of chloride ions remaining in the solution. With this information the milliequivalents of chloride ion that had been removed from the acid solution were calculated. In this manner the capacity of these resin particles was found to be 4.82 milliequivalents of chloride ions per gram of bone dry resin particles.

Twenty grams of these finely divided anion resin particles were mixed with 20 gms. of strong acid, divinylbenzene-styrene copolymer-type, hydrogen-form cation resin particles in the size range of about 100 to 400 mesh. The mixture of finely divided resin particles were pre-coated on an annular cotton-wound filter screen having a surface area of 0.4 square feet. The pre-coat layer had a thickness of about 3/16 inch. A 0.75 N sodium chloride solution was passed through the filter screen and pre-coat layer at a rate of 4 g.p.m. per sq. ft. of surface area. The pressure drop was 0.85 p.s.i., which indicates that excessive fines were not produced during the grinding operation. The conductivity of the effluent was measured continually. When the effluent conductivity had reached 0.5 mmhos the run was terminated. The operating capacity was then calculated and determined to be 3.05 milliequivalents of chloride ions removed per gram of bone dry anion resin particles.

EXAMPLE II

Hydroxide-form resin particles in the size range of about 20 to 50 mesh were dried in a vacuum drier. This drier comprised an 18-inch diameter cylindrical chamber having a length of 37 inches. Mounted therein were three trays having a total area of 9 square feet. Each tray had copper tubing soldered to the bottom thereof, the copper tubing being connected to a hot water circulating system. The unit was loaded with 77 lbs. of the large bead resin particles and heat and vacuum applied. The unit was operated at a pressure of 27 inches of Hg and 138° F. water was circulated in the tubing for a period of 17 hours. Steam was then used as the heating medium and the pressure was lowered to 22 inches of Hg. The steam was at a temperature of 212° F. and was used in the coils of the drier for a period of 5½ hours. The unit was then shut down at this point and the top tray removed. The material from the top tray was found to have a total water content of 57.4% by weight of the resin particles.

The other two trays were left in the drier and dried for an additional 25¾ hours at 25 inches of Hg with 212° F. steam. The large bead resin particles dried in this manner on the lower two trays had a total water content of 31.1%.

The large bead resin particles from the bottom trays were tested and ground in the same manner and with the equipment as the large bead resins in Example I. The results are tabulated below in Table A:

Table A

| | |
|---|---|
| Total water content large bead particles, wt. percent | 31.1 |
| Free water content large bead particles, wt. percent | −27.9 |
| Total water content finely divided particles, wt. percent | 28.5 |
| Free caustic, meq./gm. of dry particles | 0.01 |
| Basicity, meq./gm. of dry particles | 3.0 |
| Capacity, meq./gm. of dry particles | 3.7 |
| Operating capacity, meq./gm. of dry particles | 1.3 |
| Pilot run, pressure drop, p.s.i. | 0.2 |

It will be noted in Table A that the free water content is expressed as a negative value. This means that the large bead resin particles are substantially without free water and contain less chemically bound water than usually present by the indicated negative value

EXAMPLE III

Eight other batches (referred to as Batches 3–10) of finely divided resin particles were made and tested in the manner described in detail in Example I. In Batches 9 and 10 the large bead resin particles were soaked in demineralized water. In Batch 8 a predetermined amount of water was added to large bead resin particles of the type used in Example I. With the exception of Batch 6, those batches in this example that had a free water content of less than 3.1% were dried in the vacuum drier discussed in Example II to the moisture content shown in Table B below. In Batch 6 large bead resin particles made in Example II from the top tray were mixed with large bead resin particles of the same type as used in Example I.

The results of these tests are tabulated in Table B below:

TABLE B

| Batch | 3 | 4 | 5 | 6 | 7 | 8 | 9 [1] | 10 [1,2] |
|---|---|---|---|---|---|---|---|---|
| Total water content large bead particles, wt. percent | 37.6 | 45.0 | 50.6 | 59.9 | 60.9 | 66.6 | 72.0 | 73.0 |
| Free water content large bead particles, wt. percent | −21.4 | −14.0 | −8.4 | 0.9 | 1.9 | 7.6 | 13.0 | 14.0 |
| Total water content finely divided particles, wt. percent | 34.6 | 43.5 | 49.6 | 54.8 | 61.0 | 65.6 | 67.5 | 68.3 |
| Free caustic, meq./gm. of dry particles | 0 | 0 | 0 | 0 | 0 | 0 | 0 | 0 |
| Basicity, meq./gm. of dry particles | 3.7 | 4.0 | 4.0 | 4.0 | 4.6 | 4.6 | 4.9 | 4.8 |
| Capacity, meq./gm. of dry particles | 3.8 | 4.1 | 4.2 | 4.7 | 4.4 | 4.6 | | 4.8 |
| Operating capacity, meq./gm. of dry particles | | 1.4 | 1.9 | 3.0 | | 3.0 | 3.0 | 3.0 |
| Pilot run pressure drop, p.s.i. | 0.4 | 0.4 | 0.4 | 0.3 | | 0.9 | | 2.1 |

[1] The recovered finely divided resin particles were in paste form and could not be ground on a practical basis in the mill.
[2] A 7/16″ herringbone screen used.

The basicity, capacity and pressure drop data of Examples I, II and III were plotted and the curves are illustrated in FIGURE 1. It will be noted that if the large bead resin particles have less than about 1.9% by weight free water content, that after grinding the basicity of the finely divided resin particles is substantially decreased. Accordingly, the basicity data of Examples I, II and III establish that in accordance with the present invention the free water content of the large bead resin particles before grinding must be greater than about 1.9% by weight of the resin particles to obtain high basicity. Furthermore, as illustrated in the figure, the capacity of the finely divided resin particles is also at its highest in this range, so that high capacity and basicity are achieved by the method of the present invention.

The pressure drop curve further demonstrates that when the free water content is greater than about 7.6% by weight the production of fines is substantially increased and thereby causes undesirably high pressure drops. Accordingly, the pressure drop data of Examples I, II and III establish that the free water content should not exceed about 7.6% by weight of the resin particles.

EXAMPLE IV

Hydroxide-form resin particles in the size range of about 20 to 50 mesh were tested for free water content in the same manner as in Example I. The free water content of the large bead resin particles was found to be about 4% by weight of resin particles.

The total water content of large bead resin particles was determined in the same manner as in Example I. The total water content of these resin particles was found to be about 63% by weight of the resin particles.

About 4,000 lbs. of these large bead resin particles were fed into the Model A Pulva-Sizer mill used in Example I. The mill ground the large bead resin particles to within the size range of about 100 to 400 mesh, the major portion of the resin particles by weight being in the size range of about 200 to 400 mesh. A sample of the finely divided resin particles was weighed and dried to constant weight in an oven at about 105° F. The weight loss of these resin particles was the total water content of the resin particles.

The total water content of these finely divided resin particles was about 57–58% by weight of resin particles.

Mounted in a vertical tank having a diameter of five feet and a height of six feet were 209 two-inch diameter annular cotton-wound filter screens each having a length of 60 inches. The filter screens had a total surface area of about 550 square feet. The finely divided resin particles made in accordance with this example were mixed 1:1 by weight with strong acid, divinyl-benzene-styrene copolymer-type, hydrogen-form cation exchange resins in the size range of about 100 to 400 mesh. Each of the filter screens was pre-coated with the mixture of finely divided resin particles. A slurry of the finely divided resin particles was prepared with demineralized water. The slurry was pumped into the tank and through the filter screens, the finely divided resin particles being deposited upon the filter screens to form a pre-coat layer. The pre-coat layer was about ¼ inch in thickness.

The feed stream being treated was steam condensate water having chloride impurities of about 2,000 p.p.b. and dissolved silica impurities in the range of 50 to 200 p.p.b. The condensate water was passed through the pre-coated filter screens. The conductivity of the influent condensate stream was about 5 to 6 mmhos due to the presence of the chloride impurities. The silica was measured by standard colorimetric procedures.

The conductivity of the effluent was initially about 0.3 to 0.5 mmho. The flow of condensate water was terminated when the effluent had a conductivity in excess of 1.0 mmho. Simultaneously periodic samples of the effluent were tested for silica content by standard colorimetric procedures. Every test showed that the effluent contained less than 20 p.p.b. of silica, except toward the end of the run when the silica content went up to about 40–50 p.p.b. A known quantity of condensate water had therefore passed through the filter unit and had a known concentration of silica and chlorides. Knowing the concentration of silcia and chloride ions in the effluent, the operating capacity of these resin particles could be determined. The operating capacity was calculated to be about 2.9 milliequivalents of anion contaminants removed

What is claimed is:

1. The method of making hydroxide-form strong base, divinylbenzene-styrene copolymer anion exchange resin particles in the size range of about 60 to 400 mesh which comprises grinding in a hammer mill hydroxide-form strong base, divinylbenzene-styrene copolymer anion exchange resin particles in the size range of about 20 to 50 mesh having a free water content in the range of about 1.9 to 7.6% by weight of said resin particles.

2. The method of claim 1 wherein said free water content is in the range of about 2 to 5% by weight of said resin particles.

3. The method of making hydroxide-form strong base, divinylbenzene-styrene copolymer anion exchange resin particles in the size range of about 60 to 400 mesh, said resin particles having high basicity and capacity, which comprises adjusting the free water content of hydroxide-form strong base, divinylbenzene-styrene copolymer anion exchange resin particles in the size range of about 20 to 50 mesh to within the range of about 1.9 to 7.6% by weight of the resin particles and grinding said resin particles in a hammer mill to the size range of about 60 to 400 mesh.

4. The method of claim 3 wherein said free water content is adjusted to within the range of about 2 to 5% by weight of the resin particles.

5. The method of claim 3 wherein said resin particles are ground to within the size range of about 100 to 400 mesh.

References Cited

UNITED STATES PATENTS

| | | | |
|---|---|---|---|
| 2,726,045 | 12/1955 | Hinerfeld | 241—16 |
| 2,855,371 | 10/1958 | Abrams | 260—2.1 |
| 2,895,925 | 7/1959 | Hwa | 260—2.1 |

OTHER REFERENCES

Dowex: Ion Exchange, The Dow Chemical Company, Midland, Mich., 1959, p. 73.

Pulverizing Machinery Company brochure, Summit, N.J., November 1946, pp. 33 and 35 relied on.

WILLIAM H. SHORT, *Primary Examiner.*

M. GOLDSTEIN, *Assistant Examiner.*